United States Patent [19]
Focke et al.

[11] Patent Number: 5,762,175
[45] Date of Patent: Jun. 9, 1998

[54] APPARATUS FOR THE ORDERED TRANSPORTATION OF PACKS

[75] Inventors: Heinz Focke, Verden; Burkard Roesler, Blender, both of Germany

[73] Assignee: Focke & Co. (GmbH & Co.), Verden, Germany

[21] Appl. No.: 693,754

[22] Filed: Aug. 7, 1996

[30] Foreign Application Priority Data

Aug. 8, 1995 [DE] Germany .................. 195 29 139.5

[51] Int. Cl.$^6$ .................................................. B65G 47/31
[52] U.S. Cl. ........................ 198/461.2; 198/461.3
[58] Field of Search .................. 198/459.1, 460.1, 198/461.1, 461.2, 461.3

[56] References Cited

U.S. PATENT DOCUMENTS

| | | | |
|---|---|---|---|
| 1,871,996 | 8/1932 | Jennings . | |
| 2,669,342 | 2/1954 | Neal | 198/164 |
| 2,886,200 | 5/1959 | Thulke et al. | 216/55 |
| 3,978,969 | 9/1976 | Williams et al. | 198/461.2 |
| 4,360,098 | 11/1982 | Nordstrom | 198/419 |
| 4,364,466 | 12/1982 | Mojden | 198/459 |
| 4,443,995 | 4/1984 | Myers et al. | 198/461.3 X |
| 4,756,400 | 7/1988 | Funo et al. | 198/461.1 X |
| 4,815,581 | 3/1989 | Deutschlander | 198/461.3 |
| 4,934,510 | 6/1990 | Lutgendorf | 198/461 |
| 5,038,915 | 8/1991 | Delsanto | 198/419.3 |
| 5,097,939 | 3/1992 | Shanklin et al. | 198/460.1 X |
| 5,287,954 | 2/1994 | Draghetti | 198/460.1 |

FOREIGN PATENT DOCUMENTS

| | | |
|---|---|---|
| 216964 | 1/1961 | Germany . |
| 1257675 | 12/1967 | Germany . |
| 2151285 | 8/1972 | Germany . |
| 2346407 | 3/1974 | Germany . |
| 2514792 | 10/1975 | Germany . |
| 2510094 | 11/1975 | Germany . |
| 2708762 | 9/1977 | Germany . |
| 2938010 | 4/1980 | Germany ............... 198/461.3 |
| 3339793 | 5/1984 | Germany . |
| 3515992 | 11/1988 | Germany . |
| 9106030 | 10/1992 | Germany . |
| 4136179 | 5/1993 | Germany . |
| 4302575 | 8/1994 | Germany . |
| 4401060 | 7/1995 | Germany . |
| 3137739 | 6/1991 | Japan . |
| 1527574 | 10/1978 | United Kingdom . |

*Primary Examiner*—James R. Bidwell
*Attorney, Agent, or Firm*—Abelman, Frayne & Schwab

[57] ABSTRACT

The aim is for packs (10) which arrive in close proximity to one another or at irregular intervals from one another to be transported further at precisely predetermined spacings from one another, for example by a removal conveyor (15). For this purpose, the incoming packs (10) are accumulated, an accumulated group (19) being formed in the process, to be precise in the region of an accumulating conveyor (29). The latter transfers individual packs (10) one after the other, in accordance with the timing of the machine, onto an intermediate conveyor (20) which feeds the packs (10) to the removal conveyor (15) at higher speed and forms the desired spacing in the process. The packs (10) remain in the same conveying plane as the precise spacings are formed between them.

12 Claims, 4 Drawing Sheets

APPARATUS FOR THE ORDERED TRANSPORTATION OF PACKS

DESCRIPTION

The invention relates to an apparatus for handling, in particular, cuboidal packs during the transportation of the same, the packs, which arrive in close proximity to one another as a line of packs, forming, in the region of an accumulating conveyer, an accumulated group from which that pack which is located at the front in the transporting direction in each case is received by an intermediate conveyor and transferred onto a removal conveyor on which the packs can be transported at a precise spacing apart from one another.

Packaging technology is often beset by the conveying-related problem of making it possible for packs which arrive in close proximity or at irregular intervals to be conveyed further in precisely defined positions, namely in particular at predetermined spacings. This problem has to be solved, for example, in the case of film packs for stacks of folded paper handkerchieves. The packs are provided with an adhesive label which is applied to the packs by a labelling device. The labelling device is arranged in the region of the removal conveyor and is designed such that the packs have to be at a precise spacing apart from one another in order for the adhesive labels to be applied at a defined position during continuous operation.

The object of the invention is to propose an apparatus for handling packs during the transportation of the same, in which it is ensured that the packs have precisely defined spacings between them in the region of a removal conveyor, to be precise with the conveying speed which is predetermined by the timing of the machine being taken into account in the process.

In order to achieve this object, the apparatus according to the invention is characterized in that the intermediate conveyor comprises two driven endless conveyors which grip that pack which has been received from the accumulated group by means of conveying strands which act on mutually opposite sides of the pack.

Accordingly, the packs, which arrive in close proximity or at irregular intervals, are first of all accumulated and then received individually one after the other by the intermediate conveyor. An important feature of the invention is that the separated packs are gripped in the region of the intermediate conveyor by means of two mutually opposite, in particular laterally arranged belts and are thereby conveyed at high speed in a particularly precise manner. The packs which are thus moved to be at a precise spacing apart from one another are transferred onto the removal conveyor in the correct position.

A further special feature of the invention is that the feed conveyor for the packs and the accumulating conveyor, on the one hand, and the intermediate conveyor for forming the spacings between the packs, on the other hand, are connected in drive terms. However, the removal conveyor for the packs is provided with an independent drive. The latter is controlled in accordance with the timing of the machine. The position of the removal conveyor or the relative position of carry-along members of the removal conveyor is established and serves as a control signal for the accumulating conveyor and intermediate conveyor. The common drive of the latter conveyors is varied for adaptation to the removal conveyor, the relationship between the speeds remaining the same.

Further features of the invention relate to the design of the conveying members and the drives thereof.

An exemplary embodiment of the apparatus according to the invention is explained in more detail hereinbelow with reference to the drawings, in which.

Figure 1:
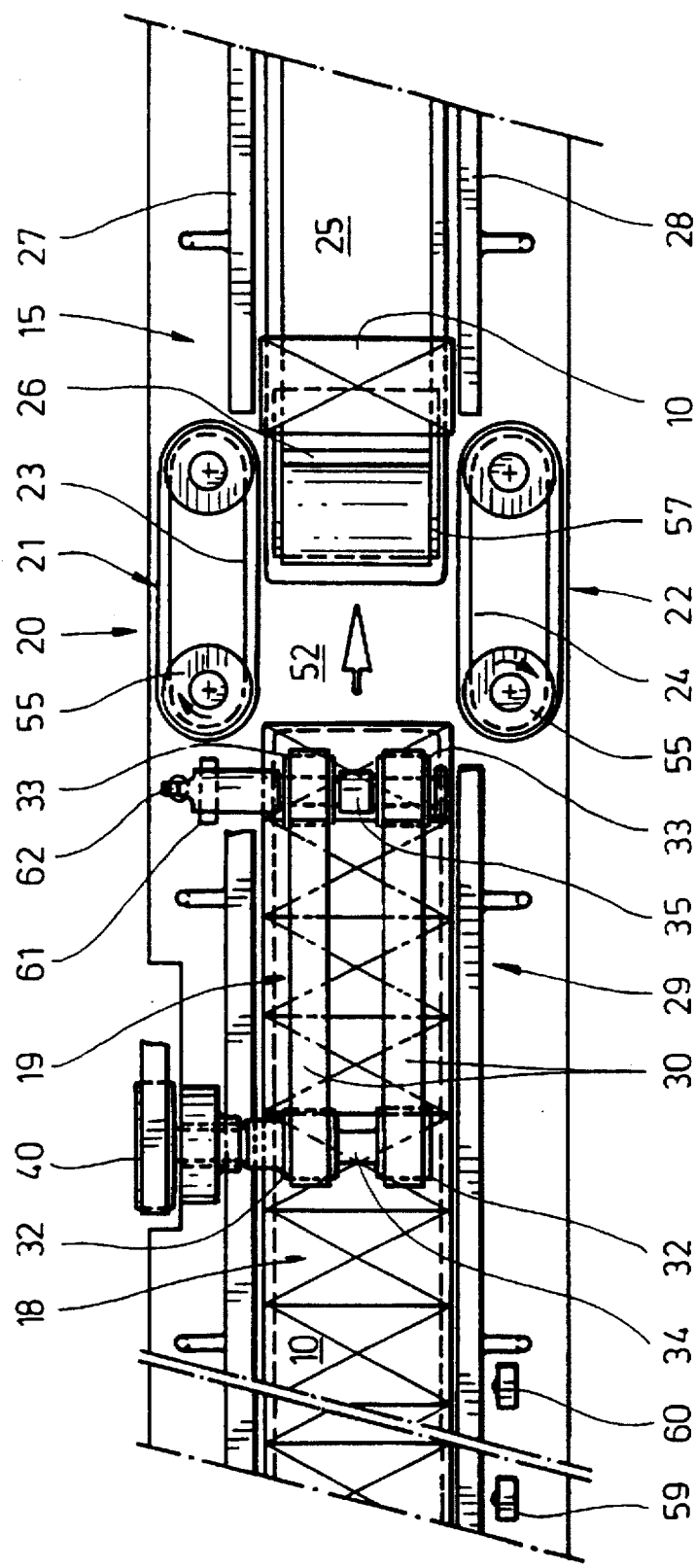
FIG. 1 shows a schematic plan view of one section of a conveying apparatus.

The present exemplary embodiment relates to the handling of cuboidal packs 10. These are soft packs, namely film-wrapped stacks of folded paper handkerchieves. These are transported such that they are oriented with their longitudinal extent transverse with respect to the conveying direction. A front side 11 is directed upwards. In the present case, the intention is for an adhesive label to be applied to the front side 11 by a labelling device (not shown). End surfaces 12, 13 of the pack are directed sideways. A rear side 14 is oriented downwards. For the purpose of applying the adhesive labels—or for other reasons—the intention is for the packs 10 to be transported continuously at equal, precise spacings apart from one another in the region of a removal conveyor 15.

The packs 10 are delivered on a feed conveyor 16, which is designed as a belt conveyor. The packs 10 are located in the abovedescribed positions relative to one another on an upper strand 17 of the feed conveyor 16.

The packs 10 form a line of packs 18. It is possible for the packs 10 to be positioned within the line of packs 17 in close proximity to one another—as is shown—or else at spacings apart from one another. A number of packs 10 which are directed towards the removal conveyor 15 are arranged in close proximity to one another in each case; in other words they form an accumulated group 19. From this group, the packs 10 are discharged individually one after the other and moved into a position at precise spacings apart from one another. In this way, the packs 10 are then transferred onto the removal conveyor 15. The respectively front pack 10 of the accumulated group 19 is released, for transfer onto the removal conveyor 15, precisely in coordination with the timing of the machine, that is to say the packs are released at predetermined temporal or spacial intervals.

The front pack 10 which has been separated off from the accumulated group 19 in each case is received by an intermediate conveyor 20 and, in the present exemplary embodiment, is fed directly from this to the removal conveyor 15. The intermediate conveyor 20 is a device with a special characteristic. It causes the pack 10 to accelerate to the conveying speed of the removal conveyor 15, with the result that the latter can transport the relevant pack 10 further in the correct position.

The intermediate conveyor 20 comprises endless conveying members, in the present case two lateral conveying belts in the form of roundbelts 21, 22. The endless roundbelts 21, 22 can be moved in a horizontal plane such that conveying strands 23, 24 rest against sideways directed surfaces, namely against the end surfaces 12, 13, of the packs 10. The intermediate conveyor 20 is positioned such that packs 10, immediately after leaving the accumulated group 19, are individually received, transported into the region of the removal conveyor 15, and deposited on an upper strand 25 of the same.

For conveying the packs 10 in the correct position, the removal conveyor 15 has carry-along members 26 which grip in each case one pack 10 on the rear side. The spacings between the carry-along members 26 correspond to the timing of the labelling device. The packs 10 delivered by the intermediate conveyor 20 are conveyed in the region of the upper strand 25 before a carry-along member 26 appears in this region. Accordingly, the packs 10 are deposited on the upper strand 25 upstream of the associated carry-along member 26, as seen in the conveying direction (FIG. 1). In order that the packs 10 are held in place against the carry-along member 26 during transportation by the removal conveyor 15, rails 27, 28 which consist of round material in the present case, that is to say are designed in the form of rods, are arranged on both sides of the conveying path. The packs 10 rest against the rails 27, 28 by means of their end surfaces 12, 13, thus producing slight friction which secures the position of the packs 10 on the removal conveyor 15.

It is in a particular way that the accumulated group 19 is introduced and controlled as regards the discharged of the packs 10 onto the intermediate conveyor 20. An accumulating conveyor 29 is assigned to the accumulated group 19, which comprises five packs 10 in the present case. Said accumulating conveyor acts in that end region of the line of packs 18 which is located at the front in the transporting direction, to be precise with the effect of a braking member which regulates the movement sequence of the packs 10.

In the present case, the accumulating conveyor 29 comprises endless conveyors, namely belts 30, 31, which run on mutually opposite sides of the line of packs 18. In the present case, the belts 30, 31 of the accumulating conveyor 29 rest against the large-surface-area sides of the packs 10, namely on the upwardly directed front side 11 and on the downwardly oriented rear side 14. The accumulating conveyor 29 comprises in each case two pairs of parallel belts 30, on the one hand, and 31, on the other hand. The two belts 30 are mounted, by means of deflection wheels 32 and 33 in each case, on a common transversely directed shaft 34 and 35, respectively. The belts 31 on the underside of the accumulated group 19 are designed and mounted in a corresponding manner, namely by means of deflection wheels 36, 37. The belts 30, 31 of the accumulating conveyor 29 are driven jointly, in this case by a drive belt 38, for example a toothed belt, chain or the like. The drive belt is driven by a drive wheel 39 beneath the movement path of the packs 10, to be precise such that wrapping around results in transmission wheels 40, 41 which are assigned in each case to the pairs of belts 30, 31 being driven. This driven for the belts 30, 31 is part of a common drive 42 for the intermediate conveyor 20 and accumulating conveyor 29.

The belts 30, 31 of the accumulating conveyor 29 are positioned such that they converge in the conveying direction of the packs 10. In the present case, a conveying strand 43 of the lower belts 31 is directed horizontally, while a conveying strand 44 of the upper belts 30 is positioned so as to be inclined downwards in the conveying direction. The belts 30, 31 thus form a gap which tapers in the conveying direction and into which the line of packs 18 runs. The relative positions here are selected such that, on the inlet side of the accumulating conveyor 29, namely in the region of the deflection wheels 32 and 36, the distance between the belts 30, 31 or the conveying strands 43, 44 is greater than the height of the packs 10. The distance decreases in the conveying direction to such an extent that, in the end, the conveying strands 43, 44 rest against the front side 11 and rear side 14 of the packs 10 and, in the event of differences in movement, exert a restraining force on the packs 10. In an advantageous exemplary embodiment, the distances are selected so as to be approximately 30 mm in the region of the deflection wheels 32 and 36 and approximately 23 mm in the region of the deflection wheels 33 and 37, the height of the packs being approximately 23 mm.

As regards the conveying speeds, the abovedescribed continuously running conveying members for the packs 10 are coordinated with one another and with the timing of the machine. This timing may, for example, be 700 cycles per minute. With the dimension of the packs being 56 mm in the conveying direction (width of the transversely located packs 10), the conveying speed of the feed conveyor 16 is, for example, 86 mm per cycle. The accumulating conveyor 29 is set to a lower speed, in particular in order to produce the accumulated group 19, this speed being 56 mm per cycle in the present case. The following intermediate conveyor 20 produces the desired spacing between packs 10 and is thus driven at a higher speed, namely at 160 mm per cycle. The same conveying speed is envisaged for the removal conveyor 15. Accordingly, for this application, the speed of the accumulating conveyor 29 is geared to the width or dimension of the pack in the conveying direction, with the result that, per cycle, one pack is transferred by the accumulating conveyor 29 onto the intermediate conveyor 20.

The coordination of the conveying movements of the intermediate conveyor 20 and accumulating conveyor 29 is aided by the common drive 42. A common drive motor namely a servomotor 45, transmits the drive power to a central drive member, to be precise to a drive pulley 46. The latter is seated on a transversely directed, horizontal main shaft 47, on which the drive wheel 39 for transmitting the drive power to the accumulating conveyor 29 is also mounted.

The roundbelts 21, 22, which belong to the intermediate conveyor 20 and are arranged on both sides of the conveying path of the packs 10, are each driven separately by said common drive 42. Drive wheels 48 for each roundbelt 21, 22 are located on the main shaft 47, on both sides of the movement path of the packs 10. The drive movement of the drive wheels is transmitted via drive belts 49—of a round profile in the present case—to an upright drive shaft 50 for each roundbelt 21, 22. The upright drive shafts 50 are retained in an upright bearing 51 which is connected, in this case, to a conveying plate 52 for the packs 10 in the region of the intermediate conveyor 20.

Figure 2:
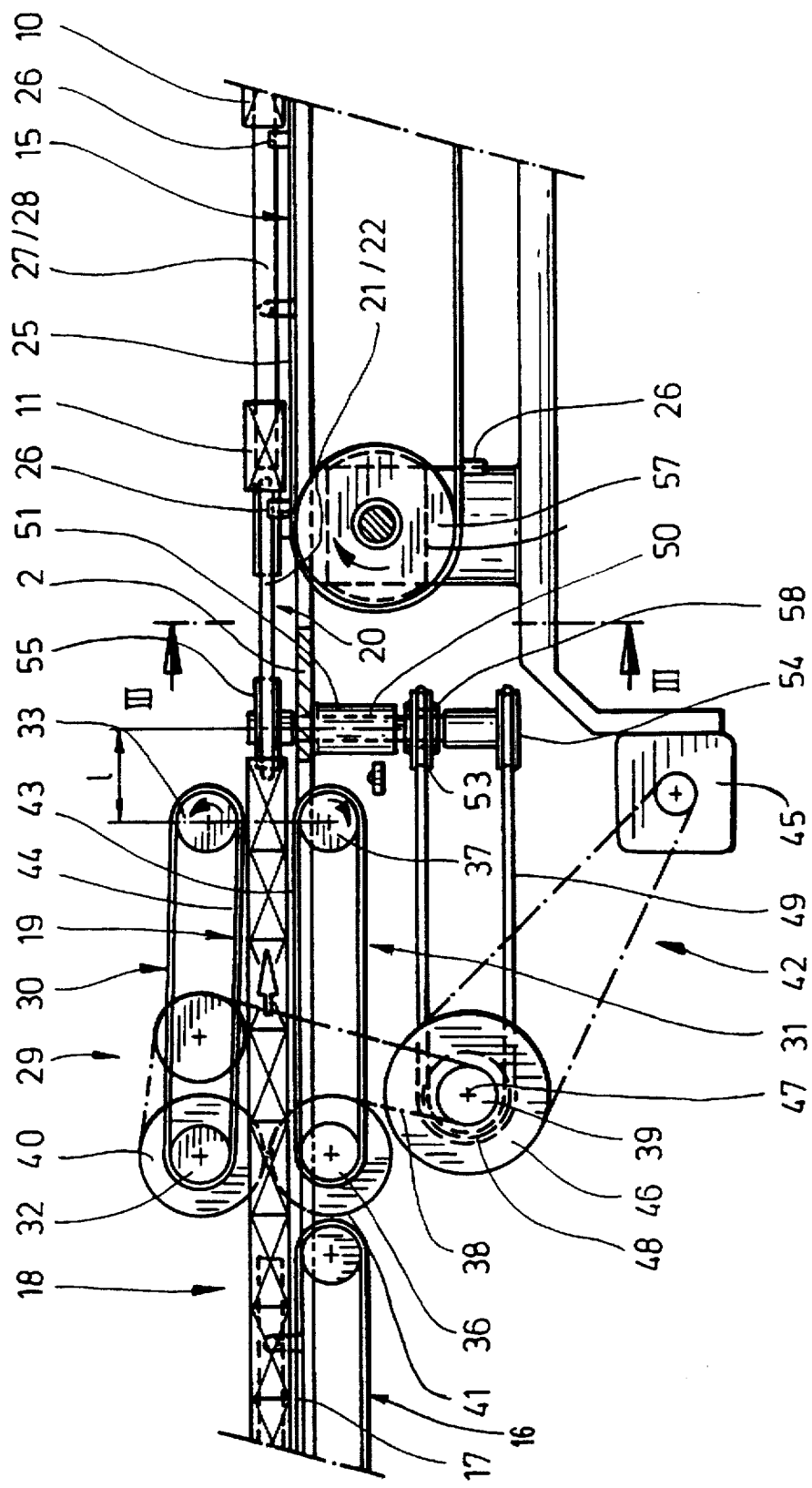
FIG. 2 shows a side view of the conveying apparatus according to FIG. 1.
Figure 3:
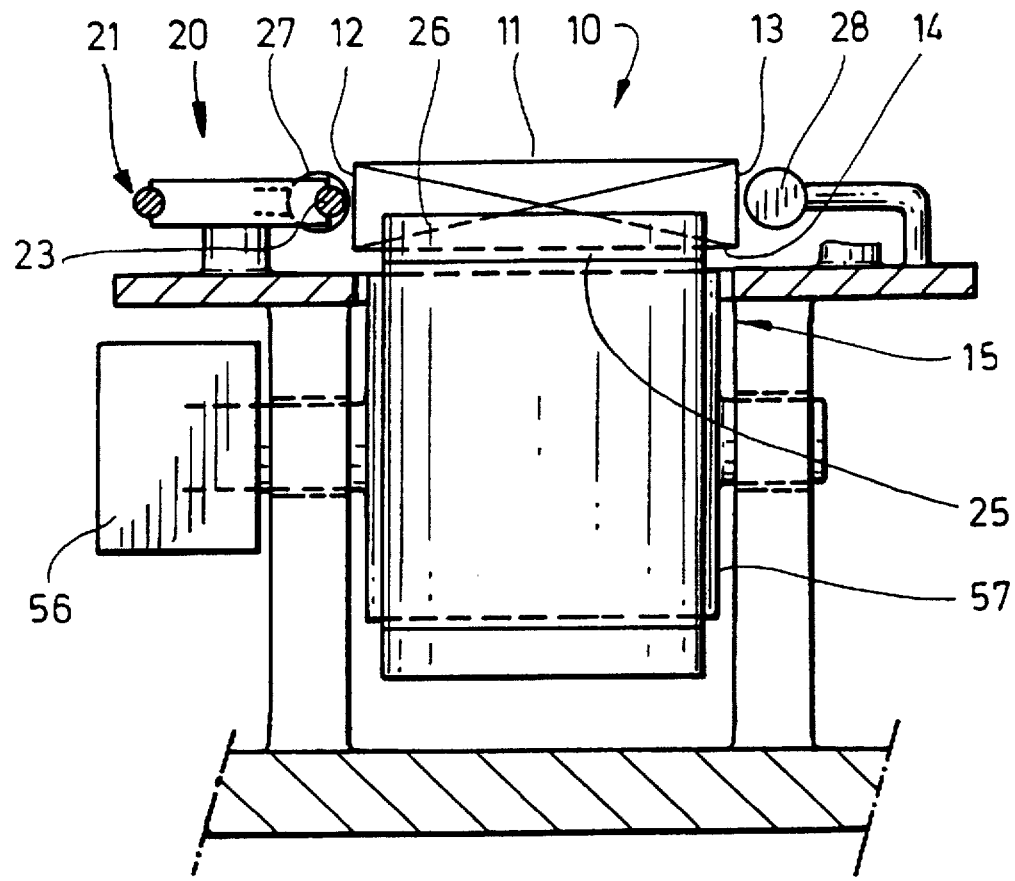
FIG. 3 shows, on an enlarged scale, a cross-section through the apparatus in the section plane III—III of FIG. 2.
Figure 4:
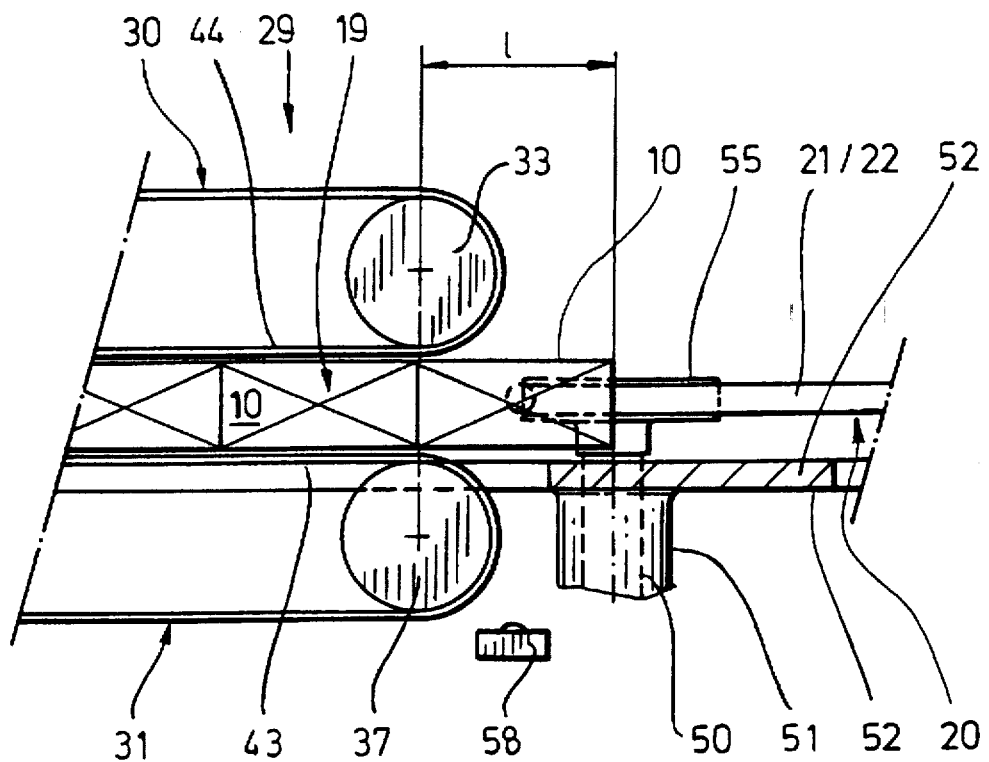
FIG. 4 shows likewise on an enlarged scale, a side view of a detail of the conveying apparatus.

For the purpose of guiding the endless drive belts 49, in each case two deflection wheels 53 and 54 are arranged one above the other on the drive shaft 50. Said deflection wheels serve to guide the endless drive belts 49 and to transmit the drive power to the drive shaft 50 and thus to a deflection roller 55 of the intermediate conveyor 20 and/or of the roundbelts 21, 22. Each side, that is to say each roundbelt 21, 22, of the intermediate conveyor 20 is moved by a drive according to FIG. 2, the servomotor 45 acting jointly for both sides.

The removal conveyor 15 is assigned a separate drive (not shown). The drive is controlled by the machine or in accordance with the timing of the machine. The precise relative position of the removal conveyor or of the carry-along members 26 thereon is established constantly and made to correspond with the fed packs 10. For this purpose, a measuring member, namely an angular encoder or a so-called resolver 56, is arranged in the region of a deflection roller 57 which belongs to the removal conveyor 15 and is directed towards the intermediate conveyor 20. At all points in time, the resolver 56 determines the position of the conveying belt of the removal conveyor 15 and thus the position of the next carry-along member 26 to follow. The conveying speed of the intermediate conveyor 20 and thus also that of the accumulating conveyor 29 are coordinated with this, with the result that a fed pack 10 in the region of the removal conveyor 15 is gripped by a carry-along member 26 immediately after transfer.

For the precise control and monitoring of the positions of the packs 10 relative to one another, monitoring members, namely sensors, are provided. Such a sensor 58 is located in the region between the accumulating conveyor 29 and intermediate conveyor 20. The distances of the conveyors from one another, namely the distances between the axes of the deflection wheels 33 and 37, on the one hand, and the deflection roller 55 of the roundbelts 21, 22, on the other hand, corresponds to the width of a pack 10 or the dimension thereof in the conveying direction ("l" in FIG. 2). The sensor 58 is positioned centrally between these axes, beneath the movement path of the packs 10, to be precise such that the packs 10 can be detected upon leaving the accumulating conveyor 29.

The sensor 58 has a double function. When the apparatus starts up, the first pack 10 located at the front in the transporting direction has to be positioned precisely for coordination with the following conveyors. In this case, the sensor 58 forms a reference point for the positioning of the front pack 10 of the accumulated group 19. The same applies in the event of a malfunction, when the apparatus is started up again. In this case, the procedure is such that, when the apparatus is started up (again), the packs 10 in the region of the accumulating conveyor 29 are first of all conveyed through the latter in the opposite direction, thus ensuring the formation of an accumulated group 19 of packs 10 which rest closely against one another. Said accumulated group 19 is then conveyed slowly in the transporting direction by the accumulating conveyor 29 until the sensor 58 is reached. This thus produces the precise position of the accumulated group 19 for the start-up of the apparatus.

When the apparatus is started up, a further special feature is brought into play; the conveying speed is increased slowly, to be precise with the utilization of two machine cycles. The interacting conveyors reach the operating speed within these two machine cycles. This means that it is only on the second machine cycle that a pack 10 reaches the removal conveyor 15.

Further sensors 59 and 60 are located in the region of the feed conveyor 16. These monitor the line of packs 18 as regards minimum or maximum filling of the feed conveyor 16 with packs 10. In both extreme cases, the apparatus is switched off.

The upper and lower belts 30 and 31 of the accumulating conveyor 29 can be moved relative to one another, with the result that the distances can be varied. In the present case, the lower belt 31 is mounted in a fixed manner and the upper belt 30 is mounted in a pivotable manner, to be precise such that it can be pivoted about the axis of the deflection wheels 32. Accordingly, the opposite deflection wheels 33 can be moved up and down, to be precise with the common shaft 35 on which the deflection wheels 33 are mounted. The lower end position of the deflection wheels 33 and of the shaft 35 is predetermined by a fixed stop 61. The shaft 35 is located thereon and thus determines the distance between the deflection wheels 33, on the one hand, and 37, on the other hand. In the present case, the shaft 35 is forced against the stop 61 by an elastic member, namely by a tension spring 62. The shaft 35, along with the deflection wheels 33, can be raised counter to the loading of the tension spring 62.

The interacting conveyors permit precise handling of the packs 10 without the conveying plane of the same being changed. Said packs are fed to the removal conveyor 15 in a continuous horizontal conveying plane.

We claim:
1. Apparatus for the handling, of cuboidal packs during the transportation of the same, the packs (10) which arrive in close proximity to one another or spaced from one another as a line of packs (18), forming, in the region of an accumulating conveyor (29), an accumulated group (19) from which that pack (10) which is located at the front in the transportation direction is received in each case by an intermediate conveyor (20) and is transferred to a discharge conveyor (15) on which the packs (10) are transported precisely spaced apart from one another, which comprises the following features:
 a) the accumulating conveyor (29) is formed from two endless conveyors which are arranged on top of one another and have belts (30, 31) between which the accumulated group (19) is grasped at the top side and the bottom side,
 b) the intermediate conveyor (20) is comprised of two lateral endless conveyors (21, 22) between which the packs (10), which have been received from the accumulated group (19), are advanced, the packs (10) being grasped sideways on mutually oppositely directed pack surfaces (12, 13) by means of conveying strands (23, 24) of the endless conveyors (21, 22),
 c) the intermediate conveyor running at a higher speed than the accumulating conveyor (29), such that the packs (10) are transferred from the intermediate conveyor (20) to the discharge conveyor (15) spaced apart from one another,
 d) the distance (1) between the accumulating conveyor (29) and the intermediate conveyor (20) arranged downstream in a conveying direction (20) corresponding approximately to the dimensions of one pack (10) in the conveying direction, whereby the packs are grasped by the intermediate conveyor (20) only after having left the accumulating conveyor (9).

2. Apparatus according to claim 1, wherein the accumulated group (19) of the line of packs (18) can be gripped on the upper side and underside by belts (30, 31) of said accumulating conveyor (29) which are two endless conveyors, and in that the endless conveyors (21, 22) of the intermediate conveyor (20) are arranged laterally next to a movement path of the packs (10), whereby the conveying strands (23, 24) of the endless conveyors (21, 22) grip the packs (10) on their sideways directed surfaces (12, 13), which are located with their longitudinal extent transverse with respect to the conveying direction.

3. Apparatus according to claim 1 characterized in that the accumulating conveyor (29) forms a space which decreases in cross-section in the conveying direction and is intended for receiving the packs (10), by the belts (30, 31) being positioned relative to one another whereby they converge in the conveying direction, the dimensions or height of the space between the belts (30, 31) being greater than the height of the packs (10) on the inlet side of the accumulating conveyor (29) and the distance corresponding approximately to the height of the packs (10) on the outlet side.

4. Apparatus according to claim 1 characterized in that the drives of the intermediate conveyor (20) and of the accumulating conveyor (29) are coordinated with one another, whereby the accumulating conveyor (29) releases one pack (10) per machine cycle and the intermediate conveyor (20) has a conveying speed which is more than double that of the accumulating conveyor (29).

5. Apparatus according to claim 1 characterized in that the intermediate conveyor (20) and the accumulating conveyor (29) are driven by a common servomotor (45) via gear mechanisms (46, 50, 53; 38, 40) with different transmission ratios.

6. Apparatus according to claim 1 wherein the conveying movement of the discharge conveyor (15), which is independently driven, is monitored constantly, in the region of a deflection roller (57) which belongs to said discharge conveyor (15) and is directed towards the intermediate conveyor (20), the monitoring of the discharge conveyor (15) detecting the relative position of carry-along members (26) which are fitted on the discharge conveyor (15) and are intended for the packs (10), whereby immediately thereafter, a pack (10) which is fed to the discharge conveyor (15) can be gripped by a carry-along member (26) in the region of an upper strand (25).

7. Apparatus according to claim 6, wherein a measuring means is located in the region of the deflection roller (57) which is associated with the discharge conveyor (15) and is directed towards the intermediate conveyor (20) for establishing the position of the discharge conveyor (15).

8. Apparatus according to claim 1 characterized in that the distance between the accumulating conveyor (29) and the intermediate conveyor (20) which follows in the conveying direction corresponds to the width of a pack (10), which is the dimension of the pack (10) in the conveying direction.

9. Apparatus according to claim 1, characterized in that a monitoring member for the packs (10), a sensor (58), is arranged, centrally, between the accumulating conveyor (29) and intermediate conveyor (20), the sensor (58) monitoring the position of a front pack (10) when the apparatus is started up.

10. Apparatus according to claim 2, characterized in that the accumulating conveyor (29) forms a space which decreases in cross-section in the conveying direction and is intended for receiving the packs (10), by the belts (30, 31) being positioned relative to one another whereby they converge in the conveying direction, the dimensions or height of the space between the belts (30, 31) being greater than the height of the packs (10) on the inlet side of the accumulating conveyor (29) and the distance corresponding approximately to the height of the packs (10) on the outlet side.

11. Apparatus according to claim 1, wherein the cuboidal pack (10), having large front and rear sides (14), rests against the belts (30, 31) of the accumulating conveyor (29) and, with small end surfaces (12, 13), against the lateral conveying strands (23, 24) of the intermediate conveyor (20), whereby a narrow side face of the pack (10) if located at the front in the conveying direction.

12. Apparatus according to claim 1, wherein the discharge conveyor (15) is an endless conveyor on whose upper strand (25) the packs (10) which arrive from the intermediate conveyor (20) come to rest, and providing discharge conveyor (15) with carry-along members (26) immediately adjacent a pack surface which is located at the rear in the conveying direction.

* * * * *